US005870381A

United States Patent [19]

Kawasaki et al.

[11] Patent Number: 5,870,381

[45] Date of Patent: Feb. 9, 1999

[54] METHOD FOR TRANSMITTING SIGNALS FROM A PLURALITY OF TRANSMITTING UNITS AND RECEIVING THE SIGNALS

[75] Inventors: Shinji Kawasaki, Osaka; Susumu Nishimoto, Tenri, both of Japan

[73] Assignee: Matsushita Electric Industrial Co., Ltd., Osaka, Japan

[21] Appl. No.: 677,751

[22] Filed: Jul. 10, 1996

[30] Foreign Application Priority Data

Jul. 10, 1995 [JP] Japan ........................... 7-173133

[51] Int. Cl.[6] ........................... H04J 3/10

[52] U.S. Cl. ........................... 370/213; 370/201; 340/825.04

[58] Field of Search ........................... 340/825.62, 825.64, 340/825.69, 825.04, 870.13, 870.15; 370/201, 213; 359/142, 148, 154, 123, 115

[56] References Cited

U.S. PATENT DOCUMENTS

| | | | |
|---|---|---|---|
| 4,748,446 | 5/1988 | Hayworth | 340/825.64 |
| 4,931,790 | 6/1990 | Kobayashi et al. | 340/825.64 |
| 5,311,550 | 5/1994 | Fouche et al. | 375/260 |
| 5,331,450 | 7/1994 | Heep et al. | 340/825.53 |
| 5,363,368 | 11/1994 | Vatt et al. | 370/280 |
| 5,436,899 | 7/1995 | Funjino et al. | 370/433 |
| 5,440,559 | 8/1995 | Gaskill | 376/439 |
| 5,663,716 | 9/1997 | Miwa et al. | 340/825.04 |

*Primary Examiner*—Chau Nguyen
*Assistant Examiner*—Kenneth Vanderpaye
*Attorney, Agent, or Firm*—Lowe Hauptman Gopstein Gilman & Berner

[57] ABSTRACT

N signals are transmitted from each of N transmitting units to a receiving unit every signal transmission cycle (N≧2). In this case, N signal transmitting periods of N I-th signals and (N−1) I-th transmission short pausing periods for each of the I-th transmitting units are alternately placed in each of I-th signal grouping periods (1≦I≦N), and an I-th transmission long pausing period follows each of the I-th signal grouping periods to set one signal transmission cycle composed of one I-th signal grouping period and one I-th transmission long pausing period for each of the I-th transmitting unit. A time length of each first transmission short pausing period is equal to that of the signal transmitting period, a time length of each I-th transmission short pausing period is (2N+2I−5) times as long as that of the signal transmitting period, and a time length of the signal transmission cycle is 4N(N−1) times as long as the signal transmitting period. Therefore, there is no probability that two or more signals for the j-th transmitting unit overlap with two or more signals for the k-th transmitting unit (1≦j≦N, 1≦k≦N), and at least one signal not overlapping with any other signal is transmitted from each of the transmitting units to the receiving unit every signal transmission cycle.

13 Claims, 9 Drawing Sheets

METHOD FOR TRANSMITTING SIGNALS FROM A PLURALITY OF TRANSMITTING UNITS AND RECEIVING THE SIGNALS

BACKGROUND OF THE INVENTION

1. FIELD OF THE INVENTION

The present invention relates generally to a signal transmitting and receiving method, and more particularly to a method for transmitting signals from a plurality of transmitting units at prescribed intervals.

2. DESCRIPTION OF THE RELATED ART

A remote control system in which various apparatuses are remote-controlled is well-known as an example of a data transmission. In this remote control system, data is transmitted from a transmitting unit placed far apart from an apparatus to the apparatus through a space for the purpose of remote-controlling the apparatus, the transmitted data is received in a receiving unit placed in the apparatus and is decoded, and a signal corresponding to the decode data is transmitted to the apparatus.

In general, the remote control system is operated according to a data transmitting and receiving method in which pieces of transmission data are transmitted from a transmitting unit to a receiving unit at prescribed intervals. In a conventional data transmitting and receiving method, only a single transmission unit is operated. Also, even though a plurality of transmission units are operated the transmission units are not simultaneously operated in the conventional data transmitting and receiving method. In other words, in cases where a plurality of transmitting units placed in a limited area are simultaneously operated or in cases where a plurality of transmission signals overlapped with each other are transmitted from a plurality of transmitting units, it is impossible to decode the transmission signals overlapped with each other in a receiving unit of an apparatus. Therefore, there is a drawback that the apparatus cannot be remote-controlled.

To solve the above drawback, a first conventional data transmitting and receiving method in which a data transmission interval adopted in one transmitting unit differs from that in another transmitting unit is well-known. Also, a second conventional data transmitting and receiving method in which a plurality of transmission frequencies are used according to a frequency multiplexing method is well-known. Also, a conventional polling method in which a two-way communication is performed and a transmission timing at each of a plurality of transmitting units is regulated is well-known.

2.1. PREVIOUSLY PROPOSED ART

An example of the first conventional data transmitting and receiving method is described with reference to FIG. 1.

FIG. 1 shows a timing chart of three series of signals transmitted from three transmitting units according to the first conventional data transmitting and receiving method.

As shown in FIG. 1, a plurality of first signals S1 respectively having a signal width are transmitted from a first transmitting unit at first specific intervals, a plurality of second signals S2 respectively having the same signal width are transmitted from a second transmitting unit at second specific intervals, and a plurality of third signals S3 respectively having the same signal width are transmitted from a third transmitting unit at third specific intervals. The signal width for the first, second and third signals is called a signal transmitting period T, a period in which any first signal S1 is not transmitted is called a first signal transmission pausing period X1, a period in which any second signal S2 is not transmitted is called a second signal transmission pausing period X2, and a period in which any third signal S3 is not transmitted is called a third signal transmission pausing period X3.

In cases where the signal transmission pausing periods X1, X2 and X3 differ from each other, a part of the first signals S1 are not simultaneously transmitted with any second or third signal. That is, the part of the first signals S1 are transmitted to a receiving unit without overlapping with any second or third signal. Also, a part of the second signals S2 are transmitted to the receiving unit without overlapping with any first or second signal, and a part of the third signals S3 are transmitted to the receiving unit without overlapping with any first or second signal.

Accordingly, when the first, second and third signals are continued to be transmitted to the receiving unit for a prescribed period or more, even though the first, second and third transmitting units are simultaneously operated, the first, second and third signals can be reliably transmitted to the receiving unit.

2.2. PROBLEMS TO BE SOLVED BY THE INVENTION

However, because the transmission of the first, second and third signals to the receiving unit is performed when each of the signals is not overlapped with any other signal by chance, the first, second and third signals cannot be reliably transmitted to the receiving unit unless the first, second and third signals are continued to be transmitted to the receiving unit for a prescribed period or more.

Also, in cases where the number of transmitting units is increased, a probability that the signals are simultaneously overlapped with each other is increased, and there is a drawback that a probability that the signals are reliably transmitted to the receiving unit is decreased.

Also, in the second conventional data transmitting and receiving method, because a plurality of frequencies are used, there is a drawback that complicated circuits such as a modulation circuit, a synchronizing circuit and the like and expensive parts are required.

Also, in the third conventional data transmitting and receiving method, because two-way communication is performed between a pair of apparatuses, a transmitting unit and a receiving unit are required for each of the apparatuses. Therefore, there is a drawback that each of the apparatuses is manufactured in a large size and is expensive.

SUMMARY OF THE INVENTION

An object of the present invention is to provide, with due consideration to the drawbacks of such a conventional data transmitting and receiving method, a method for transmitting signals from a plurality of transmitting units at prescribed intervals in which the signals are reliably transmitted to a receiving unit even though the number of transmitting units is increased and the receiving and transmitting units are simplified.

The object is achieved by the provision of a data transmitting and receiving method, comprising the steps of:

- preparing M signals (M is an integral number higher than 2) respectively having a signal transmitting period as a signal width in each of N transmitting units (N is an integral number higher than 2, and $N \leqq M$), a time length of the signal transmitting period being in common to the N transmitting units;
- alternately arranging the signal transmitting periods of the M signals and (M−1) transmission short pausing periods in a signal grouping period for each of the N transmitting units to place the M signals at equal intervals;

adjusting N time lengths of N groups of the (M−1) transmission short pausing periods respectively corresponding one of the N transmitting units on condition that two or more signals of one transmitting unit do not overlap with two or more signals of each of the other transmitting units;

setting a signal transmitting cycle having a common time length to the N transmitting units, to place each of the signal grouping periods having different time lengths in the signal transmitting cycle for each of the N transmitting units; and transmitting the M signals respectively spaced by the transmission short pausing period, of which the time length is adjusted, from each of the N transmitting units to a receiving unit every signal transmitting cycle.

In the above steps, M signals are transmitted from each of N transmitting units to a receiving unit every signal transmitting cycle. In this case, each of the signal transmitted from the transmitting units has the same signal transmitting period as a signal width, the M signals are equally spaced by a transmission short pausing period, the transmission short pausing period for one transmitting unit differs from that for another transmitting unit on condition that two or more signals transmitted from one transmitting unit do not overlap with two or more signals transmitted from each of the other transmitting units.

Accordingly, at least one signal transmitted from each of the transmitting units does not overlap with any signal transmitted from one of the other transmitting units and is received by the receiving unit as an effective signal. Therefore, data indicated by a series of effective signals in a series of signal transmission cycles can be reliably transmitted from each transmitting unit to the receiving unit.

Also, because the M signals transmitted from each of the transmitting units are equally spaced, A configuration of each transmitting unit can be simplified.

It is preferred that the step of preparing M signals includes the step of:

classifying the N transmitting units into a first transmitting unit and one or more I-th transmitting units (I is an integral number, and 2≦I≦N), and the step of adjusting N time lengths of N groups of the (M−1) transmission short pausing periods, comprises the steps of:

adjusting the (M−1) transmission short pausing periods for the first transmitting unit to a common time length equal to that of the signal transmitting period; and adjusting the (M−1) transmission short pausing periods for each of the I-th transmitting units to another common time length which is (2*N+2*I−5) or more times as long as that of the signal transmitting period.

In the above steps, because the signal grouping period for the first transmitting unit is equal to or shorter than any of the I-th transmission short pausing periods for the I-th transmitting units, there is no probability that two or more signals for the first transmitting unit overlap with two or more signals for one of the other transmitting units. Also, because a summed time length of one I-th transmission short pausing period for the I-th transmitting unit and two signal transmitting periods is equal to or shorter than one (I+1)-th transmission short pausing period for the (I+1)-th transmitting unit and because a summed time length of two second transmission short pausing periods for the second transmitting unit and one signal transmitting period is equal to or longer than another summed time length of one N-th transmission short pausing period for the N-th transmitting unit and two signal transmitting periods, there is no probability that two or more signals for the j-th transmitting unit overlap with two or more signals for the k-th transmitting unit (2≦j≦N, 2≦k≦N).

Also, it is preferred that the step of preparing M signals includes the step of:

calling the N transmitting units a plurality of I-th transmitting units (I is an integral number, and 1≦I≦N), and the step of adjusting N time lengths of N groups of the (M−1) transmission short pausing periods, comprises the step of:

adjusting the (M−1) transmission short pausing periods for each of the I-th transmitting units to a common time length which is (2*N+2*I−3) or more times as long as that of the signal transmitting period.

In the above steps, because a summed time length of one I-th transmission short pausing period for the I-th transmitting unit and two signal transmitting periods is equal to or shorter than one (I+1)-th transmission short pausing period for the (I+1)-th transmitting unit and because a summed time length of two second transmission short pausing periods for the second transmitting unit and one signal transmitting period is equal to or longer than another summed time length of one N-th transmission short pausing period for the N-th transmitting unit and two signal transmitting periods, there is no probability that two or more signals for the j-th transmitting unit overlap with two or more signals for the k-th transmitting unit (2≦j≦N, 2≦k≦N).

Also, it is preferred that the step of preparing M signals includes the step of:

calling the N transmitting units a plurality of I-th transmitting units (I is an integral number, and 1≦I≦N), and the step of adjusting N time lengths of N groups of the (M−1) transmission short pausing periods, comprises the step of:

adjusting the (M−1) transmission short pausing periods for each of the I-th transmitting units to a common time length on condition that each of the transmission short pausing periods for the (I+1)-th transmitting unit is equal to or longer than the signal grouping period for the I-th transmitting unit.

In the above steps, because the (I+1)-th transmitting unit is equal to or longer than the signal grouping period for the I-th transmitting unit, there is no probability that two or more signals for the j-th transmitting unit overlap with two or more signals for the k-th transmitting unit (2≦j≦N, 2≦k≦N).

BRIEF DESCRIPTION OF THE DRAWINGS

The objects, features and advantages of the present invention will be apparent from the following description taken in conjunction with the accompanying drawings, in which.

DETAILED DESCRIPTION OF THE EMBODIMENTS

Preferred embodiments of a method for transmitting signals from a plurality of transmitting units at prescribed intervals according to the present invention are described with reference to drawings.

Figure 1:
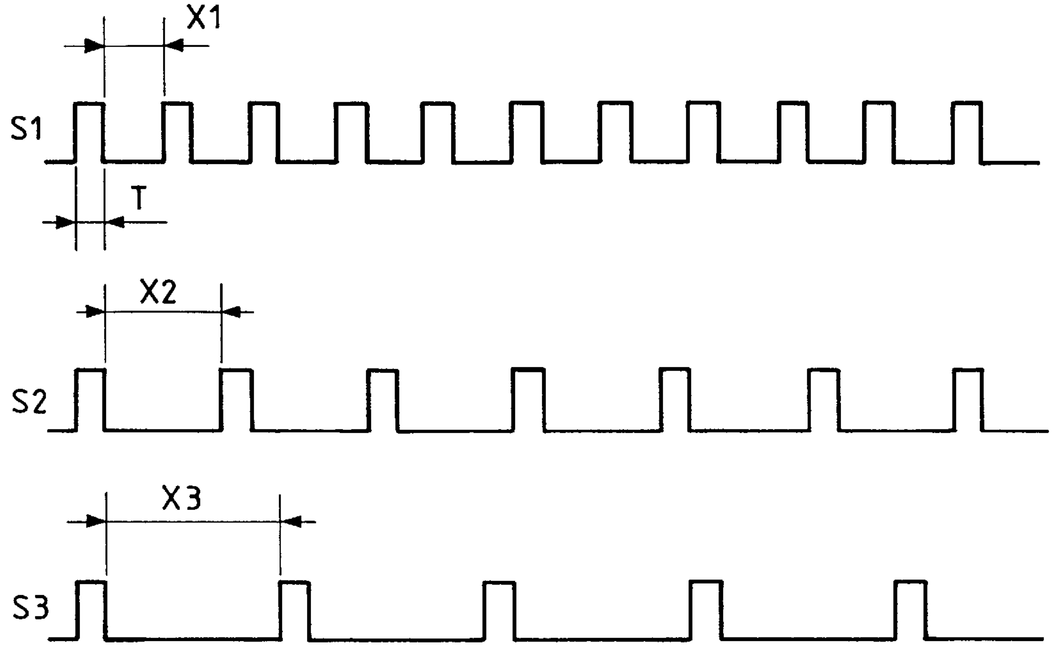
FIG. 1 PRIOR ART
FIG. 1 shows a timing chart of three series of signals transmitted from three transmitting units according to the first conventional data transmitting and receiving method.
Figure 2:
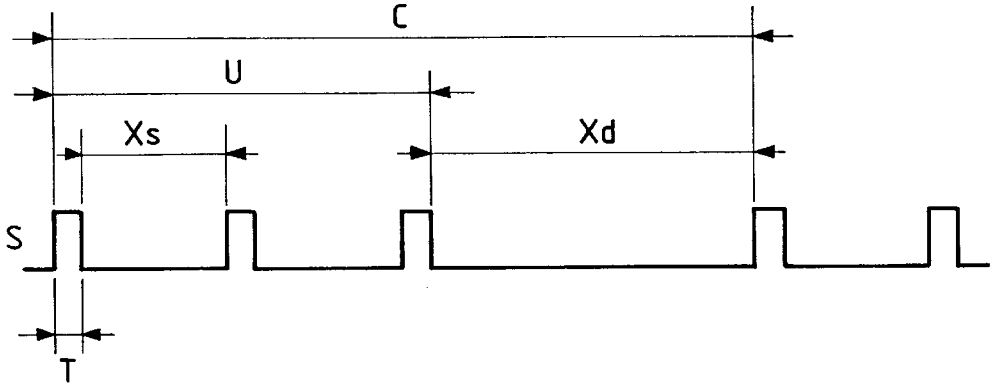
FIG. 2 shows a timing chart of a series of signals transmitted from a transmitting unit according to the present invention.

FIG. 2 shows a timing chart of a series of signals transmitted from a transmitting unit according to the present invention.

As shown in FIG. 2, three signals S are transmitted every signal transmission cycle C, each of signal transmission cycles C is partitioned into a signal grouping period U and a transmission long pausing period Xd following the signal grouping period U, three signal transmission periods T and two transmission short pausing periods Xs are alternately placed in each of signal grouping periods U. The two transmission short pausing periods Xs and the transmission long pausing period Xd are generically called a signal transmission pausing period.

First Embodiment

Figure 3A:
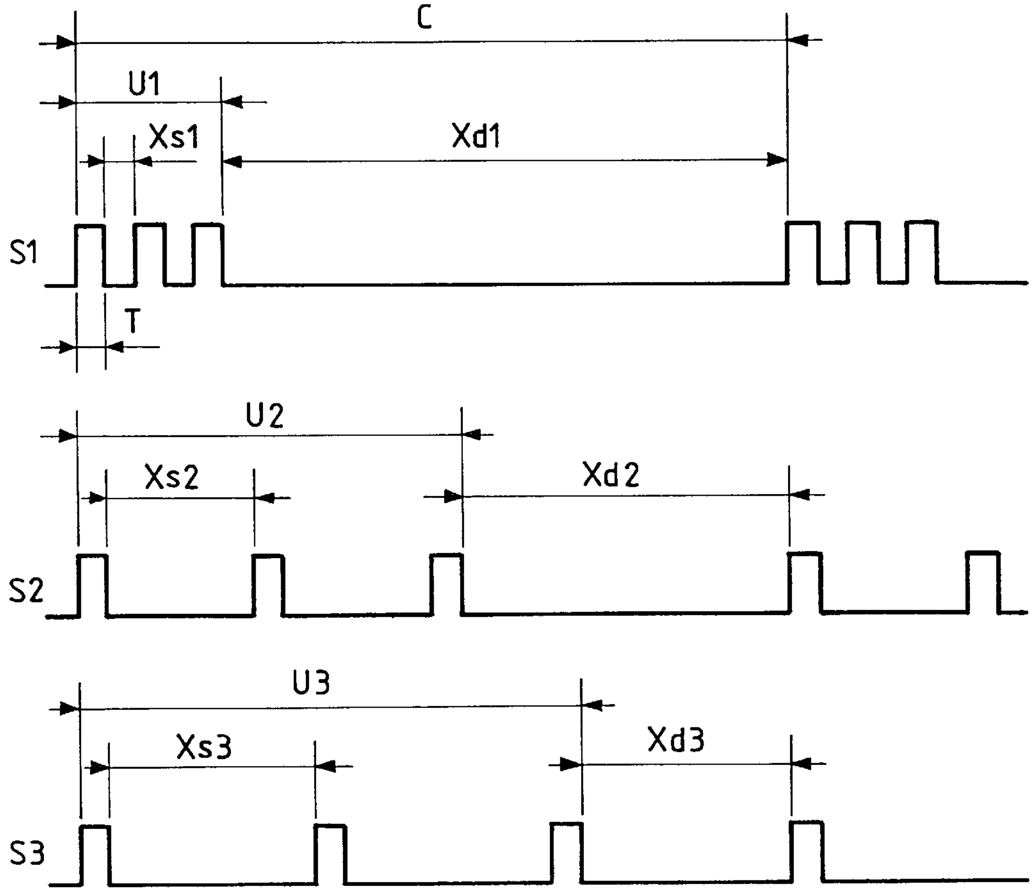
FIG. 3A shows a timing chart of three series of signals transmitted from three transmitting units according to a first embodiment of the present invention.

FIG. 3A shows a timing chart of three series of signals transmitted from three transmitting units according to a first embodiment of the present invention.

As shown in FIG. 3A, in cases where the number of transmitting units is indicated by a value N, N signals are transmitted from each of transmitting units every signal transmission cycle C. For example, in case of N=3, three first signals S1 respectively having a signal transmission period T as a signal width are transmitted from a first transmitting unit TU1, three signal transmission periods T and two first transmission short pausing periods Xs1 are alternately placed in each of first signal grouping periods U1 to equally space the first signals S1 by the first transmission short pausing period Xs1, and a first transmission long pausing period Xd1 is placed after the first signal grouping period U1 in each of the signal transmission cycle C. The first transmission short pausing period Xs1 is equal to the signal transmission period T (Xs1=T). Therefore, the first signal grouping period U1 is five times as long as the signal transmission period T (U1=5*T).

Also, three second signals S2 respectively having the same signal transmission period T as a signal width are transmitted from a second transmitting unit TU2, three signal transmission periods T and two second transmission short pausing periods Xs2 are alternately placed in each of second signal grouping periods U2 to equally space the second signals S2 by the second transmission short pausing period Xs2, and a second transmission long pausing period Xd2 is placed after the second signal grouping period U2 in each of the signal transmission cycle C.

Also, three third signals S3 respectively having the same signal transmission period T as a signal width are transmitted from a third transmitting unit TU3, three signal transmission periods T and two third transmission short pausing periods Xs3 are alternately placed in each of third signal grouping periods U3 to equally space the third signals S3 by the third transmission short pausing period Xs3, and a third transmission long pausing period Xd3 is placed after the third signal grouping period U3 in each of the signal transmission cycle C.

In cases where the number of the transmitting unit TUi ($2 \leqq i \leqq n$) is indicated by a value I (I is an integral number higher than 1), the transmission short pausing period Xsi except the first transmission short pausing period Xs1 is (2*N+2*I−5) times as long as the signal transmission period T. That is, because a relationship of N=3 and I=2 is satisfied for the second signals S2, the second transmission short pausing period Xs2 is five times as long as the signal transmission period T (Xs2=5T). Because the three signal transmission periods T and the two second transmission short pausing periods Xs2 are alternately placed in the second signal grouping period U2, a relationship U2=13*T is obtained. Also, because N=3 and I=3 is satisfied for the third signals S3, the third transmission short pausing period Xs3=(2*N+2*I−5)T is seven times as long as the signal transmission period T (Xs3=7T). Because the three signal transmission periods T and the two third transmission short pausing periods Xs3 are alternately placed in the third signal grouping period U3, a relationship U3=17*T is obtained.

The third transmission long pausing period Xd3 is set to be equal to the third transmission short pausing period Xs3 because the period Xd3 is the final transmission long pausing period (Xd3=Xs3=7T), so that the signal transmission cycle C is set to 24T because the third signal grouping period U3 is 17T. In this case, the first transmission long pausing period Xd1 is set to 19T because the first signal grouping period U1 is 5T, and the second transmission long pausing period Xd2 is set to 11T because the second signal grouping period U2 is 13T.

Figure 3B:
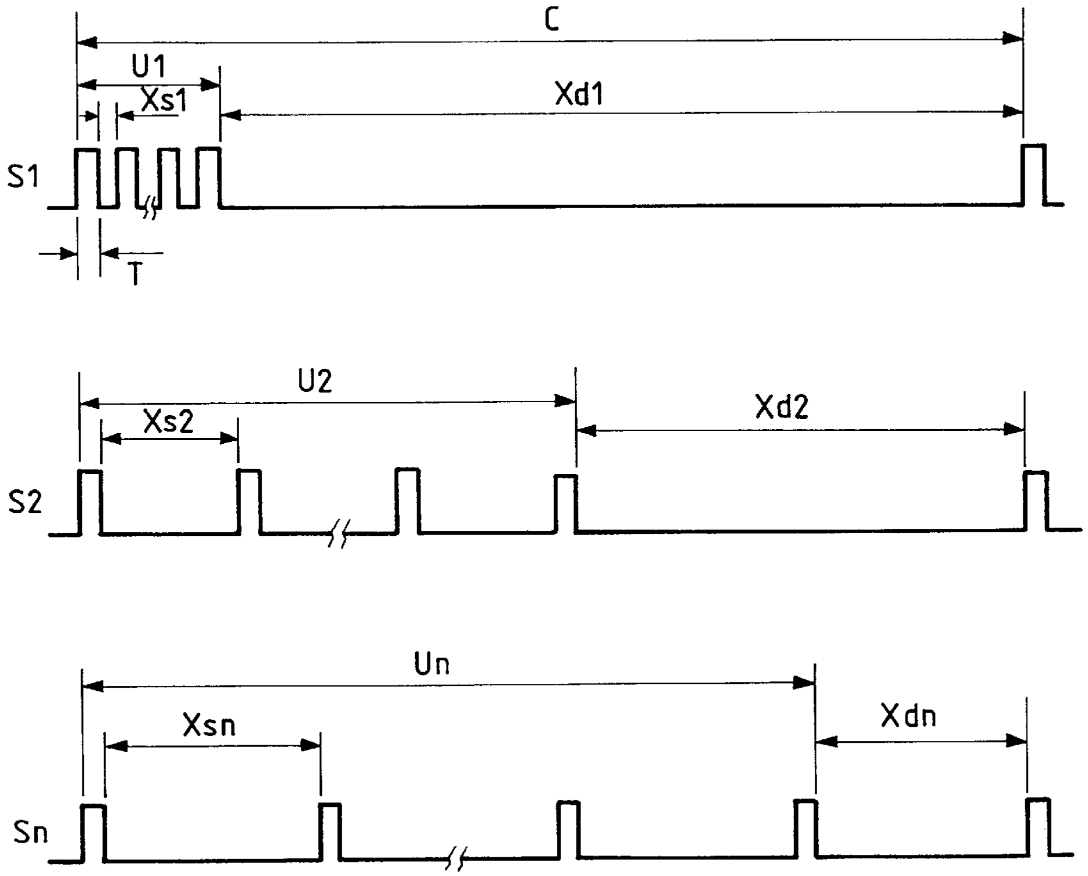
FIG. 3B shows a timing chart of N series of signals transmitted from N transmitting units according to the first embodiment.

In general, as shown in FIG. 3B, in cases where N types of signals are simultaneously transmitted from N transmitting units, N signals are transmitted from each of N transmitting units every signal transmission cycle. In the first transmitting unit TU1, because N signal transmission periods T for N first signals S1 and (N−1) first transmission short pausing periods Xs1=T are alternately placed in the first signal grouping period U1, a relationship U1=(2N−1)T is determined. In the i-th transmitting unit UNi (i=2, 3, - - - , n), because N signal transmission periods T for N i-th signals Si and (N−1) i-th transmission short pausing periods Xsi=(2N+2I−5)T are alternately placed in the i-th signal grouping period Ui, a relationship Ui={N+(N−1)(2N+2I−5)}T is determined. Also, because the final transmission short pausing period Xsn is (4N−5)T, the final transmission long pausing period Xdn is set to (4N−5)T. Because the final signal grouping period Un is $(4N^2-8N+5)T$, the signal transmission cycle C is set to 4N(N−1)T. In this case, because of the i-th signal grouping period Ui={N+(N−1)(2N+2I−5)}T, the i-th transmission long pausing period Xdi={4N(N−1)−N−(N1)*(2N+2I−5)}T is placed after the i-th signal grouping period Ui for each signal transmission cycle C. Also, because of the first signal grouping period U1=(2N−1)T, the first transmission long pausing period Xd1=($4N^2$−6N+1)T is placed after the first signal grouping period U1 for each signal transmission cycle C.

Figure 4:
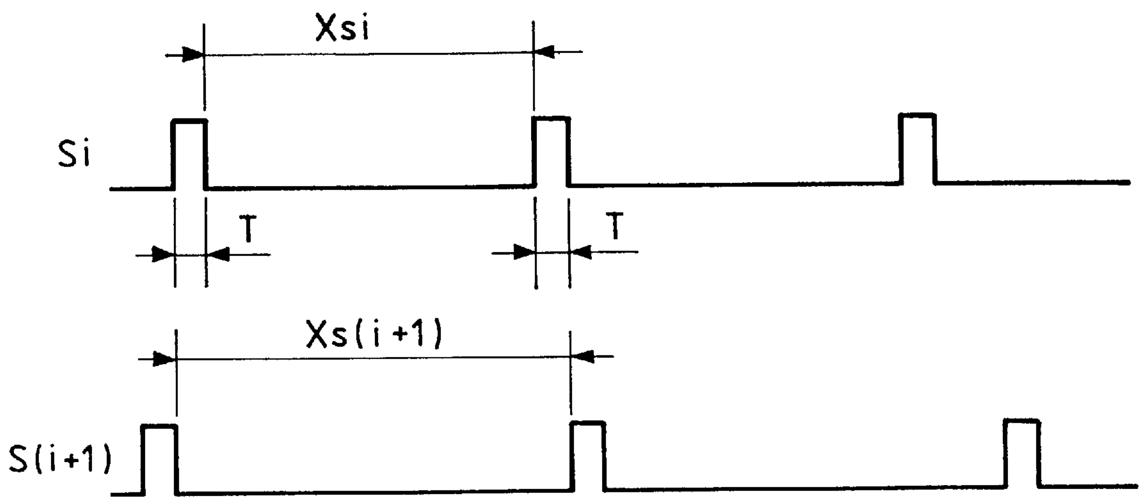
FIG. 4 shows a timing chart for explaining a relationship between two transmission short pausing periods for a pair of transmitting units TUi and TU(i+1) according to the first embodiment.

In the above signal transmitting and receiving method, as shown in FIG. 4, the (i+1)-th transmission short pausing period Xs(i+1) is longer than the i-th transmission short pausing period Xsi by 2T. Therefore, even though the transmission timing of the i-th signals Si shifts from that of the (i+1)-th signals S(i+1) by any time period, there is no probability that two or more i-th signals Si simultaneously overlap with two or more (i+1)-th signals S(i+1). Also, because the i-th transmission short pausing period Xsi is longer than the first transmission short pausing period Xs1 by I*T, there is no probability that two or more first signals S1 simultaneously overlap with another type of signals Si.

Figure 5:
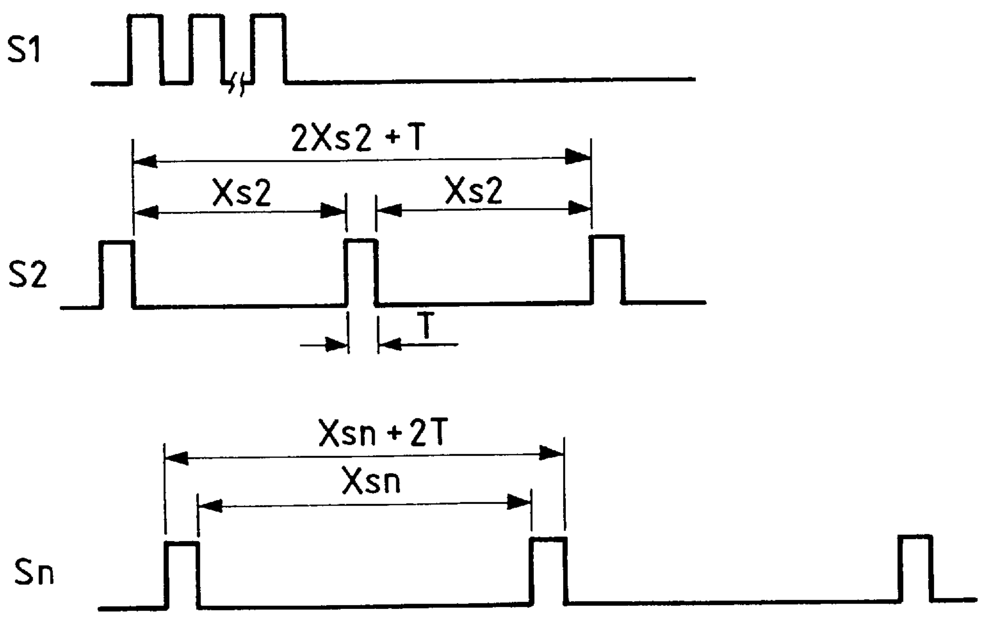
FIG. 5 shows a timing chart for explaining a probability that two signals S1 transmitted from one transmitting unit overlap with other two signals Sn transmitted from another transmitting unit according to the first embodiment.

Also, as shown in FIG. 5, in cases where a first period Xsn+2T obtained by adding the final transmission short pausing period Xsn and two signal transmitting periods T is longer than a second period 2Xs2+T obtained by adding two second transmission short pausing periods Xs2 and one signal transmitting period T, there is a probability that two j-th signals Sj (j≧2) transmitted from the j-th transmitting unit TUj simultaneously overlap with two k-th signals Sk (k≧2) transmitted from the transmitting unit Tuk in one signal transmitting cycle C. However, because the first period Xsn+2T is equal to (4N−3)*T and the second period 2Xs2+T is equal to (4N−1)*T, there is no probability that two or more j-th signals Sj simultaneously overlap with two or more signals Sk.

Accordingly, there is no probability that all N signals transmitted from one transmitting unit simultaneously overlaps with other signals transmitted from the other transmitting units, and one or more signals transmitted from one transmitting unit is reliably received by a receiving unit without overlapping with other signals transmitted from the other transmitting units. That is, because one signal not overlapping with any other signal is transmitted to the receiving unit for each signal transmission cycle C, it is judged in the receiving unit whether or not each of the N signals transmitted from one transmitting unit overlaps with another signal transmitted from one of the other transmitting units, one or more signals overlapped with other signals are abandoned, and at least one signal not overlapping with any other signal is received by the receiving unit as an effective signal for each signal transmission cycle C. Therefore, data indicated by a series of effective signals in a series of signal transmission cycles c can be reliably transmitted from each transmitting unit to the receiving unit.

Also, because a plurality of signals Si is transmitted from each transmitting unit TUi at a regular frequency Xsi+T and the transmission of the signals Si is stopped for a regular transmission long pausing period Xdi, the transmitting unit and the receiving unit can be simplified.

Also, because the method for transmitting signals from a plurality of transmitting units and receiving the signals in a receiving unit can be applied for a one-way communication, the transmitting unit and the receiving unit can be moreover simplified, and a small sized signal transmitting and receiving system can be manufactured at a low cost.

In this embodiment, the first transmission short pausing period Xs1 is set to the signal transmission period T to shorten the signal transmission cycle C to a minimum period. However, it is applicable that the first transmission short pausing period Xs1 is longer than the signal transmission period T.

The reason that the first transmission short pausing period Xs1 is set to the signal transmission period T is described with reference to FIG. 6.

Figure 6:
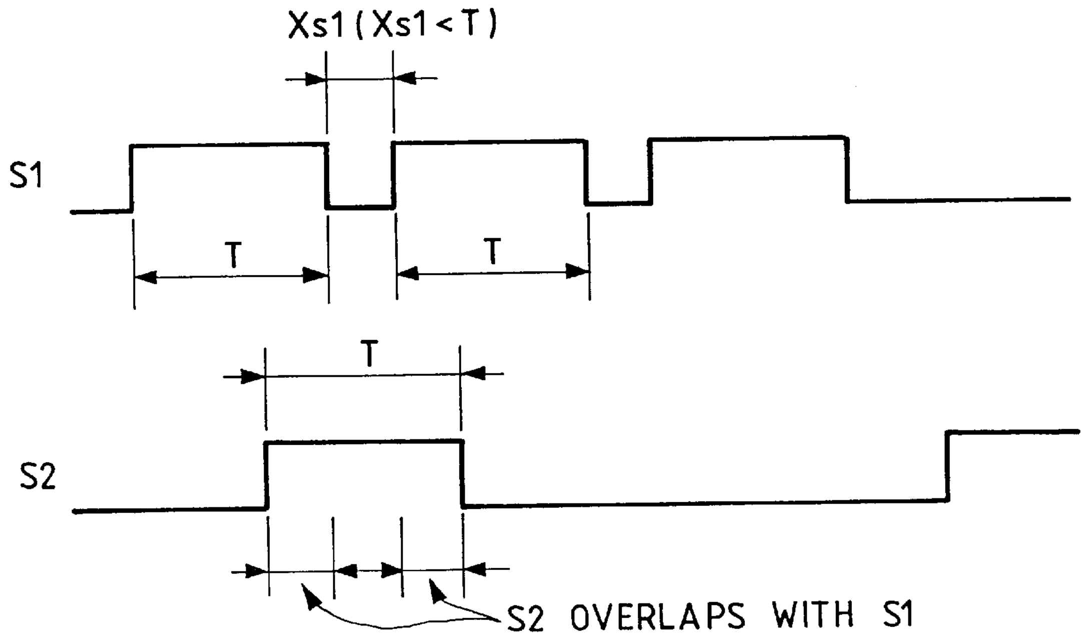
FIG. 6 shows a timing chart for explaining the reason that a first transmission short pausing period Xs1 is set to a signal transmission period T according to the present invention.

As shown in FIG. 6, in cases where the first transmission short pausing period Xs1 is shorter than the signal transmission period T, there is a probability that two first signals S1 simultaneously overlap with one signal Si transmitted from another transmitting unit TUi.In this case, even though N first signals S1 are transmitted from the first transmitting unit every signal transmission cycle C, there is a case that all N first signals S1 simultaneously overlap with other signals transmitted from the other transmitting units. Therefore, it is required that the first transmission short pausing period Xs1 is equal to or more than the signal transmission period T (Xs1≧T), and the signal transmission cycle C is minimized in cases where the first transmission short pausing period Xs1 is equal to the signal transmission period T.

Figure 7:
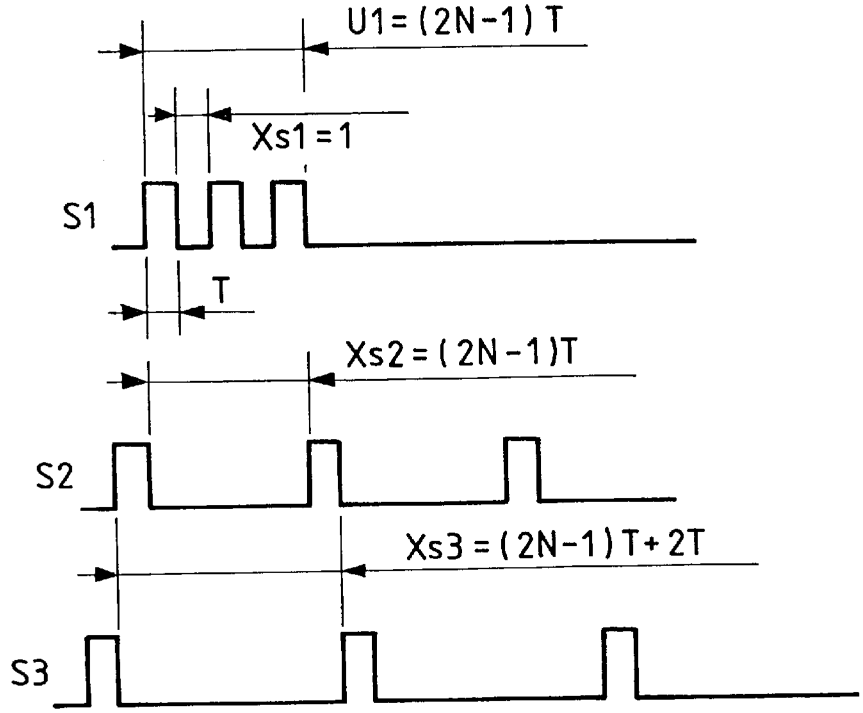
FIG. 7 shows a timing chart for explaining a relationship among three transmission short pausing periods according to the first embodiment.

Next, the reason that the transmission short pausing period Xsi except the first transmission short pausing period Xs1 is set to a value (2*N 30 2*I−5)*T is described with reference to FIG. 7.

Because U1=N*T+(N−1)*Xs1 and Xs1≧T are satisfied, a relationship $$U1 \geqq (2*N-1)*T$$

is obtained. As shown in FIG. 7, in cases where the second transmission short pausing period Xs2 is equal to or longer than the first signal grouping period U1 (Xs2≧U1), there is no probability that two or more first signals S1 simultaneously overlap with two or more second signals S2. Therefore, a relationship $$Xs2 \geqq (2*N-1)*T$$

is obtained. In cases where the (i+1)-th transmission short pausing period Xs(i+1) is longer than the i-th transmission short pausing period Xsi by 2*T or more, because there is no probability that two or more i-th signals Si simultaneously overlap with two or more (i+1) signals S(i+1), a relationship $$Xsi \geqq (2*N-1)*T+2(I-2)*T$$

is obtained. Therefore, $$Xsi \geqq (2*N+2*I-5)*T \ (I \geqq 2) \qquad (1)$$

is obtained. In cases of Xsi=(2*N+2*I−5)*T, the signal transmission cycle C is minimized.

Next, the reason that the signal transmission cycle C is set to 4N(N−1)*T is described in detail.

The signal transmission cycle C is obtained by adding the i-th signal grouping period Ui and the transmission long pausing period Xdi, and U(i+1)>Ui is satisfied. Also, the transmission long pausing period Xdi is longer than the transmission short pausing period Xsi, and Xs(i+1)>Xsi is satisfied. Therefore, because Un≧Ui and Xsn≧Xsi are satisfied (Un denotes the signal grouping period for the final transmitting unit TUn, and Xsn denotes the transmission short pausing period for the final transmitting unit TUn), $$C=Un+Xdn \qquad (2)$$

$$Xdn \geqq Xsn$$

is obtained. Because a relationship $$Un \geqq N*T+(N-1)*Xsn \quad (3)$$

is obtained, a relationship $$C \geqq N*T+(N-1)*Xsn+Xsn$$

is obtained. That is, $$C \geqq N*(T+Xsn) \quad (4)$$

is satisfied.

Because of Xsi≧(2*N+2*I−5)*T in the equation (1), a relationship $$Xsn \geqq (2*N+2*N\ 5)*T \geqq (4*N-5)*T \quad (5)$$

is obtained. Therefore, a relationship is obtained from the equations (4) and (5).

$$C \geqq N*\{T+(4*N-5)*T\} \geqq 4N*(N-1)*T$$

In case of C=4N*(N−1)*T, the signal transmission cycle C is minimized.

Therefore, in cases where the signal transmitting period T is equal to 10 msec, the signal transmission cycle C is 80 msec when two transmitting units are used, the signal transmission cycle C is 240 msec when three transmitting units are used, and the signal transmission cycle C is 480 msec when four transmitting units are used.

In this embodiment, three transmitted units are used. However, the number of transmitted units is not limited.

Also, the periods Ui, Xsi, Xdi and the cycle C are determined to minimize the cycle C. However, it is applicable that the periods Ui, Xsi, Xdi and the cycle C be lengthened.

Also, N signals are transmitted from each transmitting unit in cases where the number of transmitting units is N. However, it is applicable that a plurality of signals more than N be transmitted from each transmitting unit in cases where the number of transmitting units is N.

Also, N types of signals transmitted from N transmitting units are received in a receiving unit. However, it is applicable that N receiving units be prepared and each type of signals transmitted from one transmitting unit be received in a corresponding receiving unit.

Also, each type of signals are transmitted through a wire route or a radio-frequency route. Also, this embodiment is available for a one-way communication and a two-way communication. Also, this embodiment is available for an infrared ray communication and a sound wave communication.

Second Embodiment

Figure 8A:
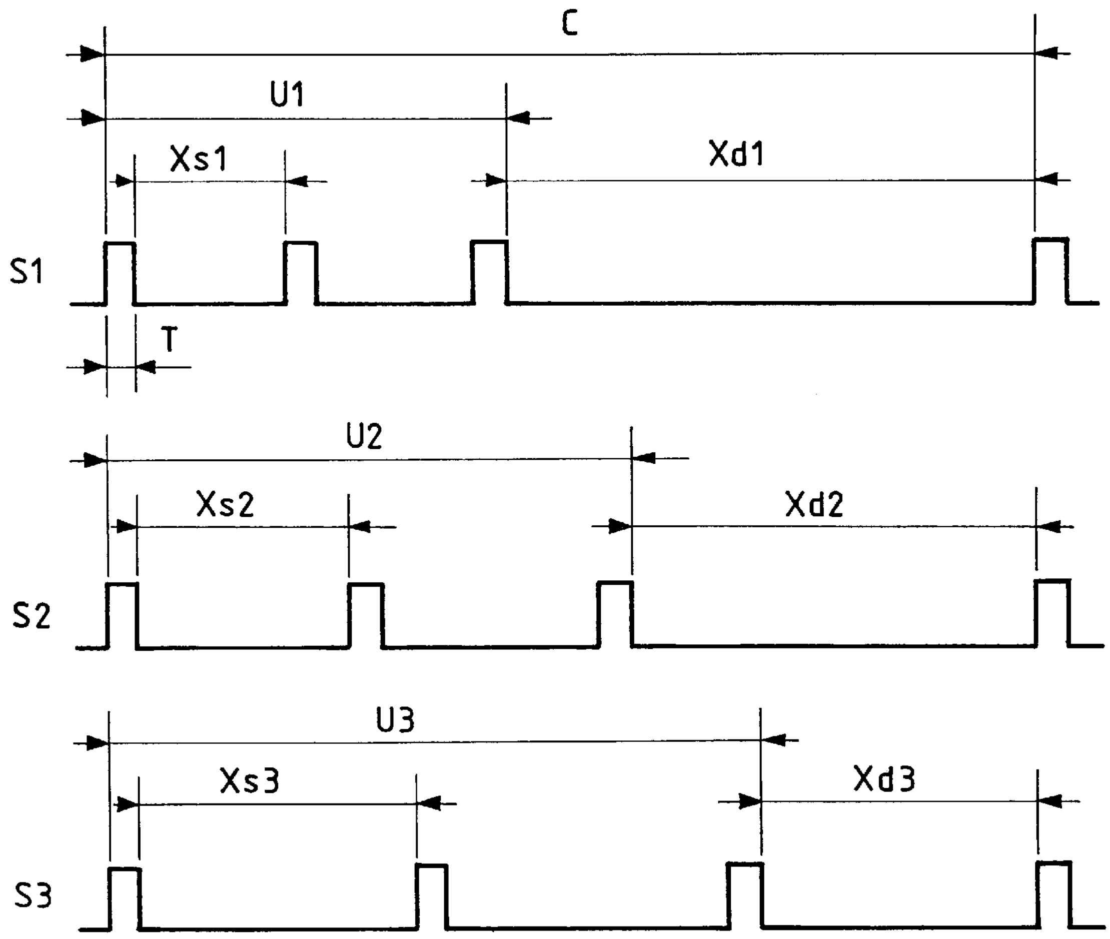
FIG. 8A shows a timing chart of three series of signals transmitted from three transmitting units according to a second embodiment of the present invention.

FIG. 8A shows a timing chart of three series of signals transmitted from three transmitting units according to a second embodiment of the present invention.

As shown in FIG. 8A, in cases where the number of transmitting units is indicated by a value N, N signals are transmitted from each of transmitting units every signal transmission cycle C. For example, in case of N=3, three first signals S1 respectively having a signal transmission period T as a signal width are transmitted from a first transmitting unit TU1, three signal transmission periods T and two first transmission short pausing periods Xs1 are alternately placed in each of first signal grouping periods U1 to equally space the first signals S1 by the first transmission short pausing period Xs1, and a first transmission long pausing period Xd1 is placed after the first signal grouping period U1 in each of the signal transmission cycle C.

Also, three second signals S2 respectively having the same signal transmission period T as a signal width are transmitted from a second transmitting unit TU2, three signal transmission periods T and two second transmission short pausing periods Xs2 are alternately placed in each of second signal grouping periods U2 to equally space the second signals S2 by the second transmission short pausing period Xs2, and a second transmission long pausing period Xd2 is placed after the second signal grouping period U2 in each of the signal transmission cycle C.

Also, three third signals S3 respectively having the same signal transmission period T as a signal width are transmitted from a third transmitting unit TU3, three signal transmission periods T and two third transmission short pausing periods Xs3 are alternately placed in each of third signal grouping periods U3 to equally space the third signals S3 by the third transmission short pausing period Xs3, and a third transmission long pausing period Xd3 is placed after the third signal grouping period U3 in each of the signal transmission cycle C.

In cases where the number of the transmitting unit TUi (1≦i≦n) is indicated by a value I (I is an integral number higher than 1), the transmission short pausing period Xsi is (2*N+2*I−3) times as long as the signal transmission period T. That is, because a relationship of N=3 and I=1 is satisfied for the first signals S1, the first transmission short pausing period Xs1 is five times as long as the signal transmission period T (Xs1=5T). Because the three signal transmission periods T and the two first transmission short pausing periods Xs1 are alternately placed in the first signal grouping period U1, a relationship U1=13*T is obtained. Also, because a relationship of N=3 and I=2 is satisfied for the second signals S2, the second transmission short pausing period Xs2=(2*N+2*I−5)T is seven times as long as the signal transmission period T (Xs2=7T). Because the three signal transmission periods T and the two second transmission short pausing periods Xs2 are alternately placed in the second signal grouping period U2, a relationship U2=17*T is obtained.

Also, because N=3 and I=3 is satisfied for the third signals S3, the third transmission short pausing period Xs3=(2*N+2*I−5)T is nine times as long as the signal transmission period T (Xs3=9T). Because the three signal transmission periods T and the two third transmission short pausing periods Xs3 are alternately placed in the third signal grouping period U3, a relationship U3=21*T is obtained.

The third transmission long pausing period Xd3 is set to be equal to the third transmission short pausing period Xs3 (Xd3=Xs3=9T) because the period Xd3 is the final transmission long pausing period, so that the signal transmission cycle C is set to 30T because the third signal grouping period U3 is 21T. In this case, the first transmission long pausing period Xd1 is set to 17T because the first signal grouping period U1 is 13T, and the second transmission long pausing period Xd2 is set to 13T because the second signal grouping period U2 is 17T.

Figure 8B:
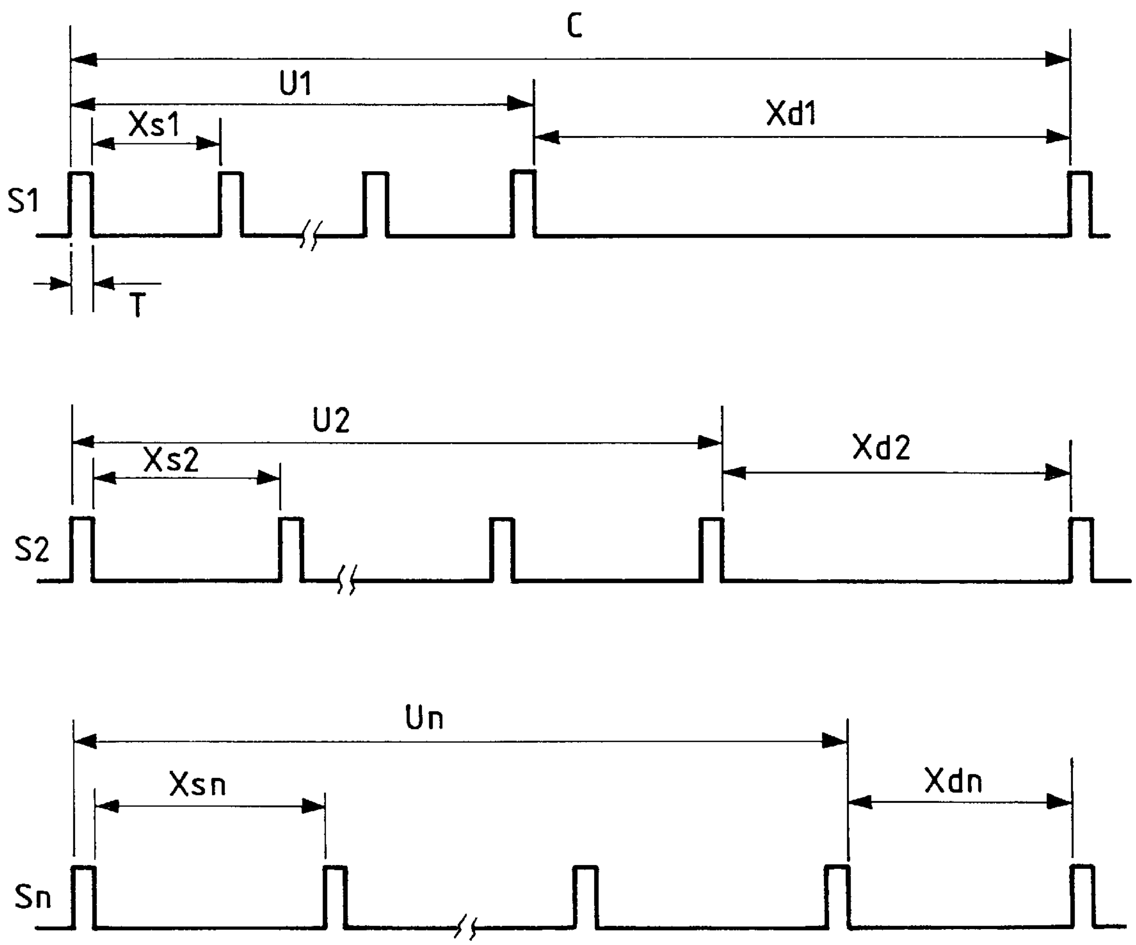
FIG. 8B shows a timing chart of N series of signals transmitted from N transmitting units according to the second embodiment.

In general, as shown in FIG. 8B, in cases where the number of transmitting units is N, N signals are transmitted from each of N transmitting units every signal transmission cycle C. In the i-th transmitting unit UNi (i=1, 2, - - - , n), because N signal transmission periods T for N i-th signals Si and (N−1) i-th transmission short pausing periods Xsi=(2N+2I−3)T are alternately placed in the i-th signal grouping period Ui, a relationship Ui={N+(N−1)(2N+2I−3)}T is determined. Also, because the final transmission short pausing period Xsn is (4N−3)T, the final transmission long pausing period Xdn is set to (4N−3)T. Because the final signal grouping period Un is $(4N^2-6N+3)T$, the signal transmission cycle C is set to 2N(2N−1)T. In this case, because of the i-th signal grouping period Ui={N+(N−1)(2N+2I−3)}T, the i-th transmission long pausing period Xdi={2N(2N−1)−N−(N−1)(2N+2I−3)}T is placed after the i-th signal grouping period Ui for each signal transmission cycle C.

In the above signal transmitting and receiving method, N types of signals are simultaneously transmitted from N transmitting units to a receiving unit, and N signals are transmitted from each of N transmitting units every signal transmission cycle C=2N(2N−1)T. In the i-th transmitting unit UNi (i=1,2, - - - , n), N signal transmission periods T for N i-th signals Si equally spaced by the (N−1) i-th transmission short pausing periods Xsi=(2N+2I−5)T are arranged in the i-th signal grouping period Ui={N+(N−1)(2N+2I−3)}T of each signal transmission cycle C, and the i-th transmission long pausing period Xdi={2(N+1)(N−I)+4I−3}T follows the i-th signal grouping period Ui for each signal transmission cycle C.

The reason that the transmission short pausing period Xsi is set to a value (2N+2I−3)T is described with reference to FIG. 9.

Figure 9:
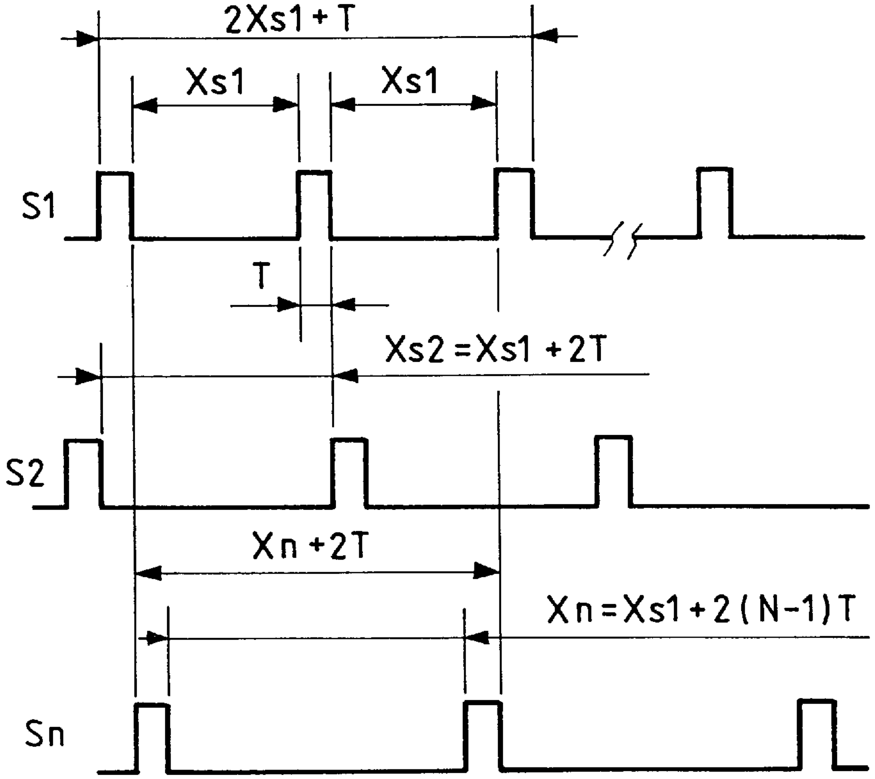
FIG. 9 shows a timing chart for explaining a probability that two signals S1 transmitted from one transmitting unit overlap with other two signals Sn transmitted from another transmitting unit according to the second embodiment.

As shown in FIG. 9, in cases where a first period Xsn+2T obtained by adding the final transmission short pausing period Xsn and two signal transmitting periods T is longer than a second period 2Xs1+T obtained by adding two first transmission short pausing periods Xs1 and one signal transmitting period T, there is a probability that two j-th signals Sj (j≧2) transmitted from the j-th transmitting unit TUj simultaneously overlap with two k-th signals Sk (k≧2) transmitted from the transmitting unit TUk in one signal transmitting cycle C. To prevent that two j-th signals Sj simultaneously overlap with two k-th signals Sk, a relationship $$2Xs1+T \geqq Xsn+2T$$

is required. That is, it is required to satisfy a relationship between the first transmission short pausing period Xs1 and the final transmission short pausing period Xsn as follows.

$$2Xs1-T \geqq Xsn \quad (6)$$

Also, in cases where the (i+1)-th transmission short pausing period Xs(i+1) is longer than the i-th transmission short pausing period Xsi by 2T or more (Xs(i+1)≧Xsi+2T), because there is no probability that two or more i-th signal Si simultaneously overlap with two or more (i+1)-th signal S(i+1), it is required to satisfy a relationship between the first transmission short pausing period Xs1 and the i-th transmission short pausing period Xsi as follows.

$$Xsi \geqq Xs1+2(I-1)*T \quad (7)$$

Therefore, another relationship between the transmission short pausing periods Xs1 and Xsn is obtained according to the equation (7).

$$Xsn \geqq Xs1+2(N-1)*T \quad (8)$$

Therefore, a relationship $$2Xs1-T \geqq Xs1+2(N-1)*T$$

is obtained according to the equations (6) and (8). That is, an equation (9) is obtained.

$$Xs1 \geqq (2N-1)*T \quad (9)$$

Therefore, a condition for the i-th transmission short pausing period Xsi is obtained according to the equations (7) and (9).

$$Xsi \geqq (2N-1)*T+2(I-1)*T$$

That is, an equation (10) is obtained.

$$Xsi \geqq (2N+2I-3)*T \quad (10)$$

That is, in cases where the i-th transmission short pausing periods Xsi are determined on condition that the equation (10) is satisfied, because the first period 2Xs1+T is equal to or shorter than the second period Xsn+2T and the (i+1)-th transmission short pausing period Xs(i+1) is longer than the i-th transmission short pausing period Xsi by 2T or more, there is no probability that two or more j-th signals Sj transmitted from one transmitting unit TUj simultaneously overlap with two or more k-th signals Sk transmitted from another transmitting unit TUk in one signal transmitting cycle C even though the transmission timing of the signals Sj shifts from that of the signals Sk by any time period.

Accordingly, there is no probability that all N signals transmitted from one transmitting unit simultaneously overlaps with other signals transmitted from the other transmitting units, and one or more signals transmitted from one transmitting unit is reliably received by a receiving unit without overlapping with other signals transmitted from the other transmitting units. That is, because one signal not overlapping with any other signal is transmitted to the receiving unit for each signal transmission cycle C, data indicated by a series of signals in a series of signal transmission cycles C can be reliably transmitted from each transmitting unit to the receiving unit.

Also, because a plurality of signals Si is transmitted from each transmitting unit TUi at a regular frequency Xsi+T and the transmission of the signals Si is stopped for a regular transmission long pausing period Xdi, the transmitting unit and the receiving unit can be simplified.

Also, because the method for transmitting signals from a plurality of transmitting units and receiving the signals in a receiving unit can be applied for a one-way communication, the transmitting unit and the receiving unit can be moreover simplified, and a small sized signal transmitting and receiving system can be manufactured at a low cost.

Next, the reason that the signal transmission cycle C is set to 2N(2N−1)*T is described in detail.

The signal transmission cycle C is obtained by adding the i-th signal grouping period Ui and the transmission long pausing period Xdi, and U(i+1)>Ui is satisfied. Also, the transmission long pausing period Xdi is longer than the transmission short pausing period Xsi, and Xs(i+1)>Xsi is satisfied. Therefore, because Un≧Ui and Xsn≧Xsi are satisfied (Un denotes the signal grouping period for the final transmitting unit TUn, and Xsn denotes the transmission short pausing period for the final transmitting unit TUn), $$C=Un+Xdn \quad (11)$$

$$Xdn \geqq Xsn$$

is obtained. Because a relationship $$Un \geqq N*T+(N-1)*Xsn$$

is obtained, a relationship $$C \geqq N*T+(N-1)*Xsn+Xsn$$

is obtained. That is, $$C \geqq N*(T+Xsn) \quad (12)$$

is satisfied.

Because of $Xsi \geqq (2*N+2*I-3)*T$ in the equation (10), a relationship $$Xsn \geqq (2*N+2*N-3)*T \geqq (4*N-3)*T \quad (13)$$

is obtained. Therefore, a relationship is obtained from the equations (12) and (13).

$$C \geqq N*\{T+(4*N-3)*T\}2N*(2N-1)*T$$

In case of $C=2N*(2N-1)*T$, the signal transmission cycle C is minimized.

Therefore, in cases where the signal transmitting period T is equal to 10 msec, the signal transmission cycle C is 120 msec when two transmitting units are used, the signal transmission cycle C is 300 msec when three transmitting units are used, and the signal transmission cycle C is 560 msec when four transmitting units are used.

In this embodiment, the transmission short pausing periods Xsi are set to satisfy the relationship $Xsi=(2N+2I-3)*T$. However, it is applicable that the transmission short pausing periods Xsi be set to satisfy the relationship $Xsi>(2N+2I-3)*T$.

Also, three transmitted units are used. However, the number of transmitted units is not limited.

Also, the periods Ui, Xsi, Xdi and the cycle C are determined to minimize the cycle C. However, it is applicable that the periods Ui, Xsi, Xdi and the cycle C be lengthened.

Also, N signals are transmitted from each transmitting unit in cases where the number of transmitting units is N. However, it is applicable that a plurality of signals more than N be transmitted from each transmitting unit in cases where the number of transmitting units is N.

Also, N types of signals transmitted from N transmitting units are received in a receiving unit. However, it is applicable that N receiving units be prepared and each type of signals transmitted from one transmitting unit be received in a corresponding receiving unit.

Third Embodiment

Figure 10:
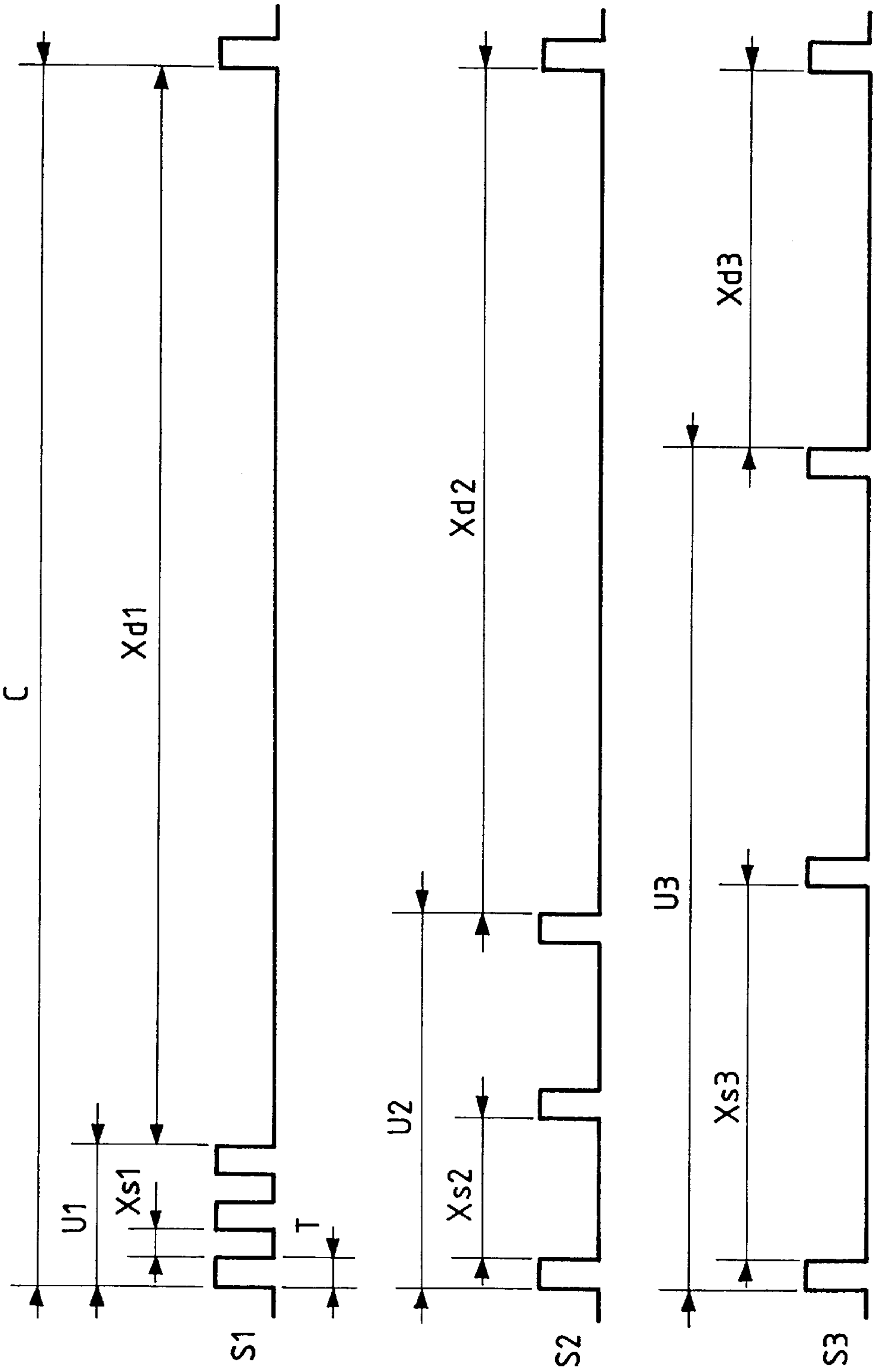
FIG. 10 shows a timing chart of three series of signals transmitted from three transmitting units according to a third embodiment of the present invention.

FIG. 10 shows a timing chart of three series of signals transmitted from three transmitting units according to a third embodiment of the present invention.

As shown in FIG. 10, in cases where the number of transmitting units is indicated by a value N, N signals are transmitted from each of transmitting units every signal transmission cycle C. For example, in case of N=3, three first signals S1 respectively having a signal transmission period T as a signal width are transmitted from a first transmitting unit TU1, three signal transmission periods T and two first transmission short pausing periods Xs1 are alternately placed in each of first signal grouping periods U1 to equally space the first signals S1 by the first transmission short pausing period Xs1, and a first transmission long pausing period Xd1 is placed after the first signal grouping period U1 in each of the signal transmission cycle C. The first transmission short pausing period Xs1 is equal to the signal transmission period T (Xs1=T). Therefore, the first signal grouping period U1 is five times as long as the signal transmission period T (U1=5*T).

Also, three second signals S2 respectively having the same signal transmission period T as a signal width are transmitted from a second transmitting unit TU2, three signal transmission periods T and two second transmission short pausing periods Xs2 are alternately placed in each of second signal grouping periods U2 to equally space the second signals S2 by the second transmission short pausing period Xs2, and a second transmission long pausing period Xd2 is placed after the second signal grouping period U2 in each of the signal transmission cycle C.

Also, three third signals S3 respectively having the same signal transmission period T as a signal width are transmitted from a third transmitting unit TU3, three signal transmission periods T and two third transmission short pausing periods Xs3 are alternately placed in each of third signal grouping periods U3 to equally space the third signals S3 by the third transmission short pausing period Xs3, and a third transmission long pausing period Xd3 is placed after the third signal grouping period U3 in each of the signal transmission cycle C.

The second transmission short pausing period Xs2 is equal to the first signal grouping period U1 (Xs2=U1=5T). Because the three signal transmission periods T and the two second transmission short pausing periods Xs2 are alternately placed in the second signal grouping period U2, the second signal grouping period U2 is equal to 13T. Also, the third transmission short pausing period Xs3 is equal to the second signal grouping period U1 (Xs3=U2=13T). Because the three signal transmission periods T and the two third transmission short pausing periods Xs3 are alternately placed in the third signal grouping period U3, the third signal grouping period U3 is equal to 29T.

The third transmission long pausing period Xd3 is equal to the third transmission short pausing period Xs3 (Xd3=Xs3=13T). Therefore, the signal transmission cycle C is set to 42T obtained by adding the third signal grouping period U3 and the third transmission long pausing period Xd3, the second transmission long pausing period Xd2 is equal to 29T obtained by subtracting the second signal grouping period U2 from the signal transmission cycle C, and the first transmission long pausing period Xd1 is equal to 37T obtained by subtracting the first signal grouping period U1 from the signal transmission cycle C.

In general, in cases where N types of signals are simultaneously transmitted from N transmitting units ($N \neq 2$), N signals are transmitted from each of N transmitting units every signal transmission cycle C. In the i-th transmitting unit UNi (i=1,2, - - - , n), the i-th transmission short pausing period Xsi is set to a time length $\{2/(N-2)*(N-1)i-N/(N-2)\}*T$ because of a relationship $Xsi*(N-1)+N=Xs(i+1)$. In this case, because N signal transmission periods T for N i-th signals Si and (N−1) i-th transmission short pausing periods Xsi are alternately placed in the i-th signal grouping period Ui, a relationship $Ui=\{2/(N-2)*(N-1)^{i+1}-N/(N-2)\}*T$ is determined. Also, because the final transmission short pausing period Xsn is $\{2/(N-2)*(N-1)^{N}-N/(N-2)\}*T$, the final transmission long pausing period Xdn is set to $\{2/(N-2)*(N-1)^{N}-N/(N-2)\}*T$. Because the final signal grouping period Un is $\{2/(N-2)*(N-1)^{N+1}-N/(N-2)\}*T$, the signal transmission cycle C is set to $\{2N/(N-2)*(N-1)^{N}-2N/(N-2)\}*T$. In this case, because of the i-th signal grouping period $Ui=\{2/(N-2)*(N-1)^{i+1}-N/(N-2)\}*T$, the i-th transmission long pausing period $Xdi=\{2N/(N-2)*(N-1)^{N}-2/(N-2)*(N-1)^{i+1}-N/(N-2)\}*T$ is placed after the i-th signal grouping period Ui for each signal transmission cycle C.

Also, in cases of N=2, Xs1=T, Xs2=3T, Xd2=3T, C=8T and Xd1=5T are set.

Accordingly, there is no probability that all N signals transmitted from one transmitting unit simultaneously overlaps with other signals transmitted from the other transmitting units, and one or more signals transmitted from one transmitting unit is reliably received by a receiving unit without overlapping with any of other signals transmitted from the other transmitting units. That is, because one signal not overlapping with any other signal is transmitted to the receiving unit for each signal transmission cycle C, data indicated by a series of signals in a series of signal transmission cycles C can be reliably transmitted from each transmitting unit to the receiving unit.

Also, because a plurality of signals Si is transmitted from each transmitting unit TUi at a regular frequency Xsi+T and the transmission of the signals Si is stopped for a regular transmission long pausing period Xdi, the transmitting unit and the receiving unit can be simplified.

Also, because the method for transmitting signals from a plurality of transmitting units and receiving the signals in a receiving unit can be applied for a one-way communication, the transmitting unit and the receiving unit can be moreover simplified, and a small sized signal transmitting and receiving system can be manufactured at a low cost.

In cases where the signal transmitting period T is equal to 10 msec, the signal transmission cycle C is 180 msec when two transmitting units are used, the signal transmission cycle C is 420 msec when three transmitting units are used, and the signal transmission cycle C is 900 msec when four transmitting units are used.

In this embodiment, the transmission short pausing periods Xsi are set to satisfy the relationship $Xsi=(2^{i+1}-3)*T$. However, it is applicable that the transmission short pausing periods Xsi be set to satisfy the relationship $Xsi>(2^{i+}-3)*T$.

Also, three transmitted units are used. However, the number of transmitted units is not limited.

Also, the periods Ui, Xsi, Xdi and the cycle C are determined to minimize the cycle C. However, it is applicable that the periods Ui, Xsi, Xdi and the cycle C be lengthened.

Also, N signals are transmitted from each transmitting unit in cases where the number of transmitting units is N. However, it is applicable that a plurality of signals more than N be transmitted from each transmitting unit in cases where the number of transmitting units is N.

Also, N types of signals transmitted from N transmitting units are received in a receiving unit. However, it is applicable that N receiving units be prepared and each type of signals transmitted from one transmitting unit be received in a corresponding receiving unit.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A data transmitting and receiving method, comprising the steps of:

preparing M signals (M is an integral number higher than 6) respectively having a signal transmitting period T as a signal width for each of N transmitting units (N is an integral number higher than 6, and N≦M), a time length of the signal transmitting period being in common to the N transmitting units;

alternately arranging the signal transmitting periods of the M signals and (M−1) transmission short pausing periods in a signal grouping period for each of the N transmitting units;

setting a minimum value allowed for each transmission short pausing period to a prescribed value Xs1 higher than 13/17*T;

placing each of the signal grouping periods within a signal transmitting cycle for each of the N transmitting units, a time length of the signal transmitting cycle being common to the N transmitting units;

adjusting (M−1) time lengths of the (M−1) transmission short pausing periods for each of the N transmitting units not to overlap at least one signal of each transmitting unit with any of the signals of the other transmitting units on condition that the signal transmitting cycle common to the N transmitting units is shorter than a specific value $(T+Xs1)*2^N$; and transmitting the M signals spaced by the (M−1) transmission short pausing periods, of which the time length is adjusted, from each of the N transmitting units to a receiving unit every signal transmitting cycle.

2. A data transmitting and receiving method according to claim 1 in which the step of placing each of the signal grouping periods comprises the steps of:

placing a transmission long pausing period after the signal grouping period for each of the transmitting units on condition that the transmission long pausing period is equal to or longer than the transmission short pausing period for each of the transmitting units; and setting a summed period of the transmission long pausing period and the signal grouping period as the signal transmitting cycle for each of the transmitting units.

3. A data transmitting and receiving method according to claim 1 in which the integral number M is equal to the integral number N.

4. A data transmitting and receiving method according to claim 1 in which the (M−1) transmission short pausing periods for each of the transmitting units have the same time length to equally space the M signals for each of the transmitting units.

5. A data transmitting and receiving method according to claim 1 in which the step of preparing M signals includes the step of:

classifying the N transmitting units into a first transmitting unit and a plurality of I-th transmitting units (I is an integral number, and 2≦I≦N), and wherein the step of adjusting (M−1) time lengths of the (M−1) transmission short pausing periods, comprises the steps of:

adjusting the time lengths of the (M−1) transmission short pausing periods for the first transmitting unit to a time length equal to that of the signal transmitting period; and adjusting the time lengths of the (M−1) transmission short pausing periods for each of the I-th transmitting units to another time length which is (2*N+2*I−5) times as long as that of the signal transmitting period.

6. A data transmitting and receiving method according to claim 5 in which the integral number M is equal to the integral number N, wherein the step of placing each of the signal grouping periods comprises the steps of:

setting a first transmission long pausing period to a time length which is $(4N^2-6N+1)$ times as long as that of the signal transmitting period for the first transmitting unit to set a summed period of the first transmission long pausing period and the signal grouping period for the first transmitting unit to a total time length which is 4N(N−1) times as long as that of the signal transmitting period;

setting an I-th transmission long pausing period to a time length which is {4N(N−1)−N−(N−1)(2N+2I−5)} times as long as that of the signal transmitting period for each of the I-th transmitting units to set a summed period of the I-th transmission long pausing period and the signal grouping period for each of the I-th transmitting units to the total time length which is 4N(N−1) times as long as that of the signal transmitting period;

placing the first transmission long pausing period after the signal grouping period for the first transmitting unit;

placing the I-th transmission long pausing period after the signal grouping period for each of the I-th transmitting units;

setting the summed period of the first transmission long pausing period and the signal grouping period for the first transmitting unit as the signal transmitting cycle having the total time length; and setting the summed period of the I-th transmission long pausing period and the signal grouping period for each of the I-th transmitting units as the signal transmitting cycle having the total time length.

7. A data transmitting and receiving method, comprising the steps of:

preparing M signals (M is an integral number higher than 2) respectively having a signal transmitting period as a signal width for each of N transmitting units (N is an integral number higher than 2, and N≦M), a time length of the signal transmitting period being in common to the N transmitting units;

alternately arranging the signal transmitting periods of the M signals and (M−1) transmission short pausing periods in a signal grouping period for each of the N transmitting units;

calling the N transmitting units a plurality of I-th transmitting units (I is an integral number, and 1≦I≦N);

adjusting the (M−1) transmission short pausing periods for each of the I-th transmitting units to a common time length which is (2*N+2*I−3) or more times as long as that of the signal transmitting period not to overlap at least one signal of each transmitting unit with any of the signals of the other transmitting units;

placing each of the signal grouping periods within a signal transmitting cycle for each of the N transmitting units, a time length of the signal transmitting cycle being common to the N transmitting units; and transmitting the M signals spaced by the (M−1) transmission short pausing periods, of which the time length is adjusted, from each of the N transmitting units to a receiving unit every signal transmitting cycle.

8. A data transmitting and receiving method according to claim 7 in which the integral number M is equal to the integral number N, and wherein the step of placing each of the signal grouping periods comprises the steps of:

setting an I-th transmission long pausing period to a time length which is {2N(2N−1)−N−(N−1)(2N+2I−3)} or more times as long as that of the signal transmitting period for each of the I-th transmitting units to set a summed period of the I-th transmission long pausing period and the signal grouping period to a total time length, which is 2N(2N−1) or more times as long as that of the signal transmitting period, for each of the I-th transmitting units;

placing the I-th transmission long pausing period after the signal grouping period for each of the I-th transmitting units; and setting the summed period of the I-th transmission long pausing period and the signal grouping period for each of the I-th transmitting units as the signal transmitting cycle having the total time length.

9. A data transmitting and receiving method, comprising the steps of:

preparing N signals (N is an integral number higher than 2) respectively having a signal transmitting period as a signal width for each of N transmitting units, a time length of the signal transmitting period being in common to the N transmitting units;

alternately arranging the signal transmitting periods of the N signals and (N−1) transmission short pausing periods in a signal grouping period for each of the N transmitting units;

calling the N transmitting units a plurality of I-th transmitting units (I is an integral number, and 1≦I≦N);

adjusting the (N−1) transmission short pausing periods for each of the I-th transmitting units to a first time length which is $\{2/(N-2)*(N-1)^{i}-N/(N-2)\}$ or more times as long as that of the signal transmitting period in case of N≠2;

adjusting a first transmission short pausing period for the first transmitting unit to a second time length which is equal to that of the signal transmitting period and adjusting a second transmission short pausing period for the second transmitting unit to a third time length which is three or more times as long as that of the signal transmitting period in case of N=2;

placing each of the signal grouping periods within a signal transmitting cycle for each of the N transmitting units, a time length of the signal transmitting cycle being common to the N transmitting units; and transmitting the N signals spaced by the N−1) transmission short pausing periods, of which the time length is adjusted, from each of the N transmitting units to a receiving unit every signal transmitting cycle.

10. A data transmitting and receiving method according to claim 9 in which the step of placing each of the signal grouping periods comprises the steps of:

setting an I-th transmission long pausing period to a time length, which is $\{2N/(N-2)*(N-1)^{N}-2/(N-2)*(N-1)^{i+1}-N/(N-2)\}$ or more times as long as that of the signal transmitting period, for each of the I-th transmitting units in case of N≠2 to set a summed period of the I-th transmission long pausing period and the signal grouping period to a total time length, which is $\{2N/(N-2)*(N-1)^{N}-2N/(N-2)\}$ or more times as long as that of the signal transmitting period, for each of the I-th transmitting units;

placing the I-th transmission long pausing period after the signal grouping period for each of the I-th transmitting units; and setting the summed period of the I-th transmission long pausing period and the signal grouping period for each of the I-th transmitting units as the signal transmitting cycle having the total time length.

11. A data transmitting and receiving method according to claim 1 in which the minimum value is Xs1 of the transmission short pausing periods is equal to the signal transmitting period T.

12. A data transmitting and receiving method, comprising the steps of:

preparing M signals (M is an integral number higher than 2) respectively having a signal transmitting period as a signal width for each of N transmitting units (N is an integral number higher than 2, and N≦M), a time length of the signal transmitting period being in common to the N transmitting units;

classifying the N transmitting units into a first transmitting unit and one or more I-th transmitting units (I is an integral number, and 2≦I≦N);

alternately arranging the signal transmitting periods of the M signals and (M−1) transmission short pausing periods in a signal grouping period for each of the N transmitting units;

adjusting (M−1) time lengths of the (M−1) transmission short pausing periods for the first transmitting unit to a first time length equal to that of the signal transmitting period;

adjusting (M−1) time lengths of the M−1) transmission short pausing periods for each of the I-th transmitting units to a second time length which is (2*N+2*I−5) or more times as long as that of the signal transmitting period not to overlap at least one signal of each transmitting unit with any of the signals of the other transmitting units;

placing each of the signal grouping periods within a signal transmitting cycle for each of the N transmitting units, a time length of the signal transmitting cycle being common to the N transmitting units; and transmitting the M signals spaced by the (M−1) transmission short pausing periods, of which the time length is adjusted, from each of the N transmitting units to a receiving unit every signal transmitting cycle.

13. A data transmitting and receiving method according to claim 12 in which the integral number M is equal to the integral number N, wherein the step of placing each of the signal grouping periods comprises the steps of:

setting a first transmission long pausing period to a time length which is $(4N^2-6N+1)$ or more times as long as that of the signal transmitting period for the first transmitting unit to set a summed period of the first transmission long pausing period and the signal grouping period for the first transmitting unit to a total time length which is 4N(N−1) or more times as long as that of the signal transmitting period;

setting an I-th transmission long pausing period to a time length which is {4N(N−1)−N−(N−1)(2N+2I−5)} or more times as long as that of the signal transmitting period for each of the I-th transmitting units to set a summed period of the I-th transmission long pausing period and the signal grouping period for each of the I-th transmitting units to the total time length which is 4N(N−1) or more times as long as that of the signal transmitting period;

placing the first transmission long pausing period after the signal grouping period for the first transmitting unit;

placing the I-th transmission long pausing period after the signal grouping period for each of the I-th transmitting units;

setting the summed period of the first transmission long pausing period and the signal grouping period for the first transmitting unit as the signal transmitting cycle having the total time length; and setting the summed period of the I-th transmission long pausing period and the signal grouping period for each of the I-th transmitting units as the signal transmitting cycle having the total time length.

* * * * *